United States Patent Office 3,101,367
Patented Aug. 20, 1963

3,101,367
α-AMINO-β-HYDROXYCARBOXYLIC ACID AMIDES
Gustav Ehrhart, Bad Soden, Taunus, Ingeborg Hennig, Kelkheim, Taunus, Karl Schmitt and Ernst Lindner, Frankfurt am Main, and Heinrich Ott, Eppstein, Taunus, Germany, assignors to Farbwerke Hoechst Aktiengesellschaft vormals Meister Lucius & Brüning, Frankfurt am Main, Germany, a corporation of Germany
No Drawing. Filed Aug. 4, 1959, Ser. No. 831,488
Claims priority, application Germany Aug. 16, 1958
6 Claims. (Cl. 260—501)

German patent specification 963,776 describes α-amino-β-hydroxybutyric acid anilides which have good antiphlogistic properties.

The present invention relates to novel α-amino-β-hydroxycarboxylic acid amides of the general formula

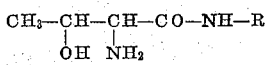

wherein R represents an aliphatic hydrocarbon radical containing a tertiary carbon atom bound to the nitrogen atom, and their non-toxic acid addition salts, which possess unexpected good analgesic properties.

A further object of the present invention are analgesic preparations that contain one of the above-mentioned α-amino-β-hydroxycarboxylic acid amides as active ingredient and, if necessary or desired, pharmaceutically usual carriers or stabilizers.

A further object of the present invention is finally a process for preparing α-amino-β-hydroxycarboxylic acid amides of the formula indicated above, process wherein acetoacetic acid amides of the general formula

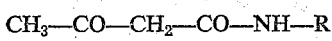

wherein R represents an aliphatic hydrocarbon radical containing a tertiary carbon atom bound to the nitrogen atom, are treated with nitrous acid or said acetoacetic acid amides are substituted in the α-position by an aryl-azo group, and the nitroso or the aryl-azo group and the keto group in the nitrosation products or in the aryl-azo compounds are then reduced. (The introduction of the isonitroso group, carried out by the treatment with nitrous acid, is hereinafter referred to as "nitrosation."

According to one possibility of carrying out the process of the present invention, the acetoacetic acid amides of the above-indicated formula are treated with nitrous acid and the nitrosation products then reduced. The acetoacetic acid amides used as starting substances can be prepared in known manner, for example, by reacting suitable amines with diketene. As such starting substances, there may be used, for example, acetoacetic acid-tert. butyl amide, acetoacetic acid-2-methyl-butyl-(2)-amide, acetoacetic acid 3-methyl-pentyl-(3)-amide, acetoacetic acid-3-ethyl-pentyl-(3)-amide.

For carrying out the nitrosation of the carbon atom in α-position it is preferred to dissolve the β-ketocarboxylic acid amide in glacial acetic acid and then to nitrostate by addition of a concentrated aqeuous solution of sodium nitrate. The β-ketocarboxylic acid amide may also be dissolved in an organic solvent and then nitrosated by adding sodium nitrite and mineral acids. As organic solvents, there may be used, for example, low molecular weight aliphatic alcohols. As mineral acids, sulfuric acid or hydrochloric acid are preferably used.

An advantageous possibility of further reacting the isonitroso compounds, obtained as intermediate products, to the desired α-amino-β-hydroxycarboxylic acid amides is represented by the following working method by which good yields are attained: At first, the isonitroso compounds are treated with reducing agents in a manner allowing only the isonitroso group to be converted into the amino group. As reducing agents there may be used in this case, for example, nascent hydrogen—obtainable by the action of dilute acids on, for example, base metals such as zinc, iron or tin—sodium hydrosulfite or tin (II) chloride. In the thus obtained α-amino-β-keto compounds, the reduction of the keto group to a secondary alcohol group is then effected in a separate reaction.

However, it may be of advantage, to intermediarily protect the amino group in α-position by acylation. As acylating agents, there are suitable acid derivatives, for example, acid halides or acid anhydrides such as acetyl chloride, propionyl chloride, benzoyl chloride, phenylacetic acid chloride, or the corresponding acid anhydride. If this working method is used, it is not necessary to isolate the intermediately forming α-amino compounds; the acylating agent can be added immediately after termiantion of the reduction of the isonitroso group. If, however, nascent hydrogen is used which was recovered by treating base metals with acids, it may be suitable to neutralize the solution by means of sodium acetate before adding the acylating agent . The same α-acylaminoacetoacetic acid amides can also be prepared via the α-aryl-azo-acetic acid amides.

According to another possibility within the scope of the process of the present invention, the acetoacetic acid amides used as starting substances are suitably converted into the α-aryl-azo compounds by reacting them with an aryl-diazonium salt. The aryl-diazonium salt solution required for the reaction can be prepared, for example, from an aromatic amine, such as aniline, with the aid of sodium nitrite. The solution so obtained is then introduced dropwise into a solution of the ketocarboxylic acid amide used as starting substance, which it is preferred to neutralize, for example, with sodium acetate. As solvent, it is suitable to use a mixture of water and low molecular weight aliphatic alcohols. The α-aryl-azo compound formed precipitates generally either during the dropwise addition or shortly after termination of the addition; after completed precipitation it can be recovered from the solution by filtration with suction with almost quantitative yield and in so pure a state that in most cases it can be further processed in the manner described below.

Another possibility within the scope of the process of the present invention for converting the α-aryl-azo-β-ketocarboxylic acid amides obtained as intermediate product into the desired α-amino-β-hydroxycarboxylic acid amides corresponds to the already described working method for the further processing of the nitrosation products, which may likewise be carried out with good yields. The keto-group in the α-amino-β-keto compounds obtained is subsequently reduced in the manner described above for the nitrosation products to a secondary alcohol group in a separate reaction; also in this case it is suitable to intermediarily protect the amino group in α-position by acylation, and it is likewise in this case not necessary to isolate the intermediately formed α-amino compounds. If the reduction is not carried out in the presence of the acylating agent, the latter can also be added directly after the reduction of the α-aryl-azo group. If, however, nascent hydrogen recovered by treating base metals with acids is used, it may be suitable to neutralize the solution by means of sodium acetate before adding the acylating agent. The aromatic amine likewise produced in this cleavage reaction is, as expected, likewise acylated under these reaction conditions. This acylation product, however, is in general easier soluble than the desired product and can thus be removed from the latter by fractional distillation.

The reduction of the keto group in the α-acylaminoacetoacetic acid amides obtained according to the two working methods described hereinbefore can be realized, for example, by means of sodium or aluminum amalgame in the presence of alcohols. It is also possible to use sodium boron hydrided, or to operate with electrolysis. Catalytical hydrogenation using, for example, such catalysts as belong to the 8th group of the periodic system, preferably nickel catalysts, can be carried out with particular results; Raney catalysts may also be used with advantage. As solvent, there can be used organic solvents, preferably low molecular weight aliphatic alcohols, if necessary in the presence of water. The operation is suitably conducted at room temperature or at slightly elevated temperatures, preferably in the range of 50 and 80° C.

The separation of the acyle group from the α-acylamino-β-hydroxycarboxylic acid amides thus obtained can be carried out according to conventional methods, for example, by saponification with mineral acids, preferably with hydrohalic acids, more particularly with hydrochloric acid or hydrobromic acid.

It is also possible so to vary the working method of the process of the present invention leading via the nitrosation products that the operation is carried out without isolation of the α-isonitroso-acetoacetic acid amides. Also in this case the starting substances are nitrosated, as described above, with sodium nitrite in the presence of acids, but the resulting reaction mixture is then directly reduced. By adding the acylating agent after terminated reduction there is obtained in this case directly the corresponding α-acylamino-acetoacetic acid amide. The same variation may also be applied in the preparation of the arylazo compounds, the isolation of which may also be dispensed with by directly reducing the reaction mixture and by then immediately adding the acylating agent. The reduction of the keto group in the α-amino- or α-acylamino-acetoacetic acid amides, to the corresponding α-amino- or α-acylamino-β-hydroxybutyric acid amides, is subsequently carried out in the manner described above.

A particularly advantageous method of preparing the products of the present invention consists in the simultaneous reduction in one operation of the isonitroso or the arylazo group in α-position and the keto group. This reduction may be effected, for example, with the aid of catalysts, for example, metals of the 8th group of the periodic system, preferably with nickel catalysts. There may also be used, for example, noble metals or Raney catalysts. As solvents, there may be used organic solvents, preferably low molecular weight aliphatic alcohols, if necessary in the presence of water. The operation is suitably conducted at room temperature or at slightly elevated temperatures, preferably in the range of 50 and 80° C. It is also possible to effect the reduction by means of nascent hydrogen obtained, for example, from sodium or aluminum amalgame and alcohol, or with sodium boron hydride. The reduction may also be carried out electrolytically. After removing the catalyst, there is obtained directly the desired α-amino-β-hydroxycarboxylic acid amide.

When operating on an industrial scale, there are obtained particularly good yields and very pure products by hydrogenating either by discontinuously injecting a solution of α-isonitroso-acetoacetic acid amides, obtained as intermediate products by nitrosation of the acetoacetic acid amides, at a pressure of 50 to 100 kg./cm.² and, if necessary, at an elevated temperature, to a suspension of the catalyst, or by pumping a solution of the α-isonitroso-β-keto-carboxylic acid amides at a pressure of 50 to 100 kg./cm.² and, if necessary, at an elevated temperature, through a continuously operating hydrogenation apparatus, the catalyst being either suspended in this solution or contained in the apparatus in granulated form. The particular advantage offered by the last mentioned working method of the process of the present invention, which includes the simultaneous reduction in one single operation step, consists in the possibility of conducting the operation in such a manner that the isonitroso group as well as the keto group are reduced as simultaneously as possible. The same is true of the simultaneous reduction of the α-arylazo group and the β-keto group, realized in one operation. It has been found that there may occur side reactions as have already been described in the literature (cf. for example, J. Am. Chem. Soc., 60, page 1328 (1938)) consisting in the condensation of 2 moles of α-amino-β-keto-carboxylic acid derivatives to the corresponding heterocyclic compounds By the reaction with inorganic or organic acids, the compounds so obtained may be converted into the corresponding salts. As inorganic acids, there enter into consideration, for example, hydrohalic acids such as hydrochloric acid and hydrobromic acid, phosphoric acid and amidosulfonic acid. As organic acids, there may be mentioned by way of example; formic acid, acetic acid, oxalic acid, malonic acid, succinic acid, lactic acid, malic acid, tartaric acid, citric acid, hydroxyethane sulfonic acid, aceturic acid, phenyldimethylpyrazolonemethyl-aminomethanesulfonic acid, ethylenediamine-tetracetic acid, benzoic acid and salicylic acid, and the derivatives thereof. These are physiologically compatible acids.

The products obtained by the process of the present invention are valuable medicaments which have a very good analgesic action while showing a relatively low toxicity. Thus, 100 mg. per kilogram of α-amino-β-hydroxybutyric acid-3-ethyl-pentyl-(3)-amide - hydrochloride, subcutaneously applied, produced in mice a distinct analgesic effect. The reaction time was prolonged from an average period of 7.7 seconds to an average period of 23.9 seconds. As regards their analgesic properties, the products of the present invention are superior to the known compounds of not only comparable but also of different chemical configuration, as is proved by the following: A dose of 1 gram/kilogram of β-hydroxybutyric acid-p-phenetidide (cf. German patent specification 964,057) orally applied produced a prolongation of the reaction time from 5 seconds to 19.8 seconds only (average value in 20 mice); an increased dose of 1.5 g./kg. of the same compound caused prolongation of the reaction time from 5.7 seconds to 25.9 seconds (average value in 30 mice). In addition to the higher efficacy, the products of the present invention are distinguished over the known products by the great advantage that they are water-soluble, thus allowing their application by subcutaneous injections, whereas the known products can be applied per os only. When comparatively testing the sodium phenyldimethyl-pyrazolonemethylaminomethanesulfonate it was found that 1 gram/kilogram of this known analgesic has, subcutaneously applied, about the same efficacy as 100 mg./kg. of α-amino-β-hydroxybutyric acid-3-ethylphentyl-(3)-amide-hydrochloride. The toxicity of the latter product, when administered intravenously, amounts to 100 mg./kg. (dos. let. min.). Clinical tests conducted for orientation showed that the α-amino-β-hydroxybutyric acid-3-ethyl-pentyl-(3)-amide, when administered per os in the form of its free base or as hydrochloride in a single dose of 300 to 500 mg. produced the expected analgesia. These tests were carried out in patients suffering from various pains (toothache, neuritis, sciatica, headache, postoperative pains, tumor pains, and the like).

The α-amino-β-hydroxybutyric acid anilides, mentioned in the first paragarph of this specification are known compounds, practically do not display any analgesic action. It, therefore, has been the more surprising that the products of the present invention possess such an excellent analgesic efficacy. The following examples serve to illustrate the invention but they are not intended to limit it thereto:

EXAMPLE 1

*α-Amino-β-Hydroxybutyric Acid-Tert. Butylamide*

(a) 85 grams of acetoacetic acid-tert. butyl amide obtained by the reaction of tert. butyl amine and diketene in benzene, are dissolved in 240 cc. of glacial acetic acid; to this solution is then added dropwise a concentrated aqueous solution of 40 grams of sodium nitrite. The reaction temperature is maintained at 20–30° C. After having concentrated under reduced pressure, a small amount of water is added to the residue and the latter is then extracted with ether. After drying and separation of the ether by distillation, there are obtained 93 grams of α-isonitroso-acetoacetic acid-tert. butyl amide in crystalline form.

(b) A solution of 50 grams of this isonitroso compound in 1 liter of methanol is hydrogenated in a pressure vessel at a temperature of 95° C. in the present of a nickel catalyst deposited on kieselguhr. After the compound has taken up the calculated amount of hydrogen, which operation is completed within a short period, the whole is filtered and the filtrate is concentrated under reduced pressure. To the residue then is added 2 N-hydrochloric acid until it shows an acid reaction to Congo paper. After filtration with charcoal, the whole is rendered alkaline by means of a 2 N-sodium hydroxide solution and then extracted with ether. The syrupy ether residue is then converted by means of alcoholic hydrochloric acid into the crystalline hydrochloride of the α-amino-β-hydroxybutyric acid-tert. butyl amide having a melting point of 221–222° C. (after recrystallization from alcohol).

EXAMPLE 2

α-Amino-β-Hydroxybutyric Acid-Tert. Butyl Amide (a) There are prepared two solutions:
Solution I: 25 grams of aniline are dissolved in 88 cc. of concentrated hydrochloric acid and 265 cc. of water; to this solution is then added dropwise at 0° C. a solution of 18.8 grams of sodium nitrite in 55 cc. of water.

Solution II: A solution of 120 grams of sodium acetate in 200 cc. of water is combined with a solution of 42.5 grams of acetic acid-tert. butyl amide in 1.2 liters of alcohol.

Solution I is added dropwise to solution II while cooling and stirring.

Stirring is continued for one hour, the yellow precipitate that has formed is filtered off with suction and yields after recrystallization from alcohol 66 grams of α-phenyl-azo-acetoacetic acid-tert. butyl amide.

(b) 66 grams of α-phenylazo-acetoacetic acid-tert. butyl amide are hydrogenated at 100° C. in 1 liter of methanol in the presence of Raney nickel as catalyst. After filtration and concentration of the filtrate, the latter is repeatedly mixed with water and concentrated in order so to remove the aniline formed by a side reaction. After addition of 2 N-hydrochloric acid until acid reaction to Congo-paper, the residue is filtrated with charcoal and concentrated under reduced pressure. There are obtained 35 grams of α-amino-β-hydroxybutyric acid-tert. butyl amide-hydrochloride having a melting point of 222° C. (after recrystallization from alcohol).

EXAMPLE 3

α-Amino-β-Hydroxybutyric Acid-2-Methyl-Butyl-(2)-Amide

In accordance with the working method described in Example 1a, 30 grams of acetoacetic acid-2-methyl-butyl-(2)-amide are converted into the isonitroso compound. After hydrogenation in the manner described in Example 1b, there is obtained the α-amino-β-hydroxy-butyric acid-2-methyl-butyl-(2)-amide, the hydrochloride of which (prepared in accordance with Example 1b) has a melting point of 187–188° C. (after recrystallization from alcohol).

EXAMPLE 4

α-Amino-β-Hydroxybutyric Acid-3-Ethylpentyl-(3)-Amide

In accordance with the working method described in Example 1a, there are obtained from 100 grams of acetoacetic acid-3-ethyl-pentyl-(3)-amide 110 grams of the isonitroso compound. After hydrogenation in the manner described in Example 1b, there is obtained the α-amino-β-hydroxy-butyric acid-3-ethyl-pentyl-(3)-amide. By conversion into the hydrochloride in the manner described above, there are obtained the hydrochlorides of the α-amino-β-hydroxy-butyric acid-3-ethyl-pentyl-(3)-amide in their two isomeric forms (threo and erythro form, respectively), which can be separated by fractional crystallization from alcohol. The high-melting compound melts at 222–223° C., the low-melting compound at 179–180° C. The analytical values of both compounds are equal, only the ultra-red spectra are different.

EXAMPLE 5

α-Amino-β-Hydroxybutyric Acid-Tert. Butyl Amide

To 50 grams of the α-isonitroso-acetoacetic acid-tert. butyl amide prepared according to Example 1a, there are added 150 cc. of glacial acetic acid and 50 cc. of acetic anhydride; into the reaction mixture, there are introduced, in portions and while stirring, 50 grams of zinc dust. After stirring for one hour at 40° C., 750 cc. of water are slowly added, while stirring is continued. After having stirred for several hours, the whole is filtered with suction and the filtrate is extracted with methylene chloride. After drying and separation of the solvent by distillation, the residue crystallizes out. The melting point of the α-acetylamino-acetoacetic acid-tert. butyl amide thus formed is at 128–130° C. (after recrystallization from ethyl acetate).

30 grams of the compound thus obtained are reduced in 100 cc. of methanol and 10 cc. of water with sodium boron hydride. After neutralization with dilute hydrochloric acid and extraction with methylene chloride, there are obtained 25 grams of α-acetamino-β-hydroxybutyric acid-tert. butyl amide having a melting point of 160–162° C. (from acetic ester).

20 grams of this compound are heated on the steam bath, with 20 cc. of concentrated hydrochloric acid and 20 cc. of water, for 20 minutes. After having been allowed to cool, the reaction mixture is rendered alkaline by means of dilute sodium hydroxide solution and shaken out with methylene chloride. After drying the separation of the solvent by distillation, there is obtained a residue which is converted into the crystalline hydrochloride of the α-amino-β-hydroxybutyric acid-tert. butyl amide having a melting point of 221–222° C. by means of alcoholic hydrochloric acid.

EXAMPLE 6

The Phenyldimethylpyrazolonemethylaminomethanesulfonate of α-Amino-β-Hydroxybutyric Acid-3-Ethylpentyl-(3)-Amide 10.8 grams of α-amino-β-hydroxybutyric acid-3-ethyl-pentyl-(3)-amide and 15.55 grams of phenyldimethyl pyrazolonemethylaminomethanesulfonic acid are dissolved in 40 cc. of alcohol and filtered. After concentration under reduced pressure, there are obtained 26 grams of the phenyldimethylpyrazolone - methylaminomethanesulfonate of α-amino-β-hydroxybutyric acid-3-ethyl-pentyl-(3)-amide in the form of a white hygroscopic powder.

EXAMPLE 7

The Maleate of α-Amino-β-Hydroxybutyric Acid-3-Ethylpentyl-(3)-Amide 18.1 grams of α-amino-β-hydroxybutyric acid-3-ethyl-pentyl-(3)-amide and 9.7 grams of maleic acid are dissolved in water. The residue is concentrated under reduced pressure and then dissolved in hot alcohol. After cooling, there is formed a crystal mass. There are obtained 25.5 grams of the maleate of α-amino-β-hydroxybutyric acid-3-ethyl-pentyl-(3)-amide. The compound melts at 132–133° C.

EXAMPLE 8

*The Salicylate of α-Amino-β-Hydroxybutyric Acid-3-Ethylpentyl-(3)-Amide*

17 grams of α-amino-β-hydroxybutyric acid-3-ethylpentyl-(3)-amide and 10.9 grams of salicylic acid are dissolved at about 40° C. in a small amount of alcohol. The solution is mixed with water until turbid and with ice to yield a crystal mass. There are obtained 20.5 grams of the salicylate of α-amino-β-hydroxybutyric acid-3-ethylpentyl-(3)-amide; the compound melts at 148–149° C.

EXAMPLE 9

*The 2,5-Dihydroxybenzoate of α-Amino-β-Hydroxybutyric Acid-3-Ethylpentyl-(3)-Amide*

23 grams of α-amino-β-hydroxybutyric acid-3-ethylpentyl-(3)-amide and 16 grams of 2,5-dihydroxybenzoic acid are dissolved at about 60° C. in 100 cc. of water. After filtration and cooling, there is obtained a crystal mass. There are obtained 31 grams of the 2,5-dihydroxybenzoate of α-amino-β-hydroxybutyric acid-3-ethylpentyl (3)-amide; the compound melts at 183–185° C.

We claim:
1. A compound selected from the group consisting of alpha-amino-beta-hydroxy-carboxylic acid amides of the formula

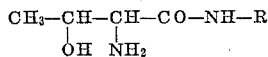

$$CH_3-CH-CH-CO-NH-R$$
$$\phantom{CH_3-}\overset{|}{OH}\phantom{-}\overset{|}{NH_2}$$

wherein R represents an alkyl radical containing from four to seven carbon atoms and containing a tertiary carbon atom linked to the nitrogen atom, and addition salts of such compounds with physiologically compatible acids.

2. α-Amino-β-hydroxybutyric acid-tert. butyl amide.
3. α-Amino-β-hydroxybutyric acid-2-methyl-butyl-(2)-amide.
4. α-Amino-β-hydroxybutyric acid-3-ethylpentyl-(3)-amide.
5. 2,5-dihydroxybenzoate of α-amino-β-hydroxybutyric acid-3-ethylpentyl-(3)-amide.
6. Salicylate of α-amino-β-hydroxybutyric acid-3-ethylpentyl-(3)-amide.

References Cited in the file of this patent

UNITED STATES PATENTS

| | | |
|---|---|---|
| 2,017,537 | Hoffmann et al. | Oct. 15, 1935 |
| 2,446,651 | Hartung | Aug. 10, 1948 |
| 2,548,863 | Bruce et al. | Apr. 17, 1951 |
| 2,601,387 | Gresham et al. | June 24, 1952 |
| 2,851,494 | Ehrhart et al. | Sept. 9, 1958 |

FOREIGN PATENTS

| | | |
|---|---|---|
| 801,454 | Germany | Jan. 8, 1951 |

OTHER REFERENCES

Degering: "An Outline of Organic Nitrogen Compounds," p. 351 (1950).

Fourneau et al.: Bull. soc. chim. France, 5th Series, vol. 6, pp. 1616–1625 (1939).

Molen et al.: Bull. soc. chim. France, 5th Series, vol. 23, pp. 923–926 (1956).

(Copies in Library.)